United States Patent
Kim et al.

(10) Patent No.: US 10,693,908 B2
(45) Date of Patent: Jun. 23, 2020

(54) APPARATUS AND METHOD FOR DETECTING DISTRIBUTED REFLECTION DENIAL OF SERVICE ATTACK

(71) Applicant: ELECTRONICS AND TELECOMMUNICATIONS RESEARCH INSTITUTE, Daejeon (KR)

(72) Inventors: Jung-Tae Kim, Daejeon (KR); Ik-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 207 days.

(21) Appl. No.: 15/803,062

(22) Filed: Nov. 3, 2017

(65) Prior Publication Data

US 2018/0131717 A1    May 10, 2018

(30) Foreign Application Priority Data

Nov. 10, 2016    (KR) .................. 10-2016-0149511

(51) Int. Cl.
*H04L 29/06* (2006.01)
*H04L 12/26* (2006.01)
(52) U.S. Cl.
CPC ...... *H04L 63/1458* (2013.01); *H04L 43/0876* (2013.01); *H04L 63/1416* (2013.01);
(Continued)
(58) Field of Classification Search
CPC ............. H04L 63/1458; H04L 63/1416; H04L 63/1425; H04L 43/0876
See application file for complete search history.

(56) References Cited

U.S. PATENT DOCUMENTS

| 7,882,556 B2 | 2/2011 | Ahn et al. |
| 9,230,102 B2 | 1/2016 | Yu et al. |

(Continued)

FOREIGN PATENT DOCUMENTS

| KR | 1020060005719 A | 1/2006 |
| KR | 100628329 B1 | 9/2006 |

(Continued)

OTHER PUBLICATIONS

Davis, Brough. Leveraging the Load Balancer to Fight DDoS. SANS Institute: Information Security Reading Room. Dec. 13, 2009 (See p. 1.) (Year: 2009).*

(Continued)

*Primary Examiner* — Carl G Colin
*Assistant Examiner* — Vance M Little
(74) *Attorney, Agent, or Firm* — Rabin & Berdo, P.C.

(57) ABSTRACT

Disclosed herein are an apparatus and method for detecting a Distributed Reflection Denial of Service (DRDoS) attack. The DRDoS attack detection apparatus includes a network flow data reception unit for receiving network flow data from network equipment, a session type determination unit for determining a session type of the received network flow data, a host type determination unit for determining a type of host corresponding to the network flow data based on the session type, an attack method determination unit for determining an attack method corresponding to the network flow data, a protocol identification unit for identifying a protocol of the network flow data, and an attack detection unit for detecting a DRDoS attack based on the session type, the host type, the attack method, and the protocol.

10 Claims, 7 Drawing Sheets

(52) U.S. Cl.
CPC ...... *H04L 63/1425* (2013.01); *H04L 63/0236* (2013.01); *H04L 63/10* (2013.01); *H04L 63/20* (2013.01)

(56) References Cited

U.S. PATENT DOCUMENTS

| | | | | |
|---|---|---|---|---|
| 2002/0051448 A1* | 5/2002 | Kalkunte | ................ | H04L 49/30 370/389 |
| 2003/0236995 A1* | 12/2003 | Fretwell, Jr. | ........ | H04L 63/1416 726/25 |
| 2005/0249214 A1* | 11/2005 | Peng | ................. | H04L 63/1458 709/224 |
| 2007/0140237 A1* | 6/2007 | Gustin | ................ | H04L 12/4641 370/389 |
| 2007/0237147 A1* | 10/2007 | Quinn | ..................... | H04L 45/50 370/392 |
| 2011/0141915 A1* | 6/2011 | Choi | ................... | H04L 41/0631 370/242 |
| 2011/0197274 A1* | 8/2011 | Callon | .................... | H04L 47/10 726/22 |
| 2014/0165183 A1* | 6/2014 | Dharmadhikari | ... | H04L 63/0227 726/13 |
| 2015/0150133 A1* | 5/2015 | Han | ................... | H04L 63/1416 726/23 |
| 2015/0256555 A1* | 9/2015 | Choi | ................... | H04L 63/1441 726/23 |
| 2015/0264073 A1* | 9/2015 | Tavakoli | ............. | H04L 63/1425 726/23 |
| 2016/0099964 A1* | 4/2016 | Htay | ................... | H04L 63/1425 726/23 |
| 2016/0182542 A1* | 6/2016 | Staniford | ............ | H04L 63/1416 726/23 |
| 2019/0098043 A1* | 3/2019 | Banerjee | ................ | H04L 12/00 |

FOREIGN PATENT DOCUMENTS

| | | |
|---|---|---|
| KR | 10-0961870 B1 | 6/2010 |
| KR | 1020110074028 A | 6/2011 |
| KR | 10-1420301 B1 | 7/2014 |
| KR | 10-2015-0088047 A | 7/2015 |
| KR | 10-1587571 B1 | 2/2016 |

OTHER PUBLICATIONS

Priya, Mohana, et al., Detecting DRDoS attack by Log File based IP pairing mechanism. Thiagarajar College of Engineering, Tamil Nadu, India, vol. 13, 2014. (Year: 2014).*

Kavisankar, A Mitigation model of TCP SYN flooding with IP Spoofing. Anna University, Chennai, India, IEEE 2011 (Year: 2011).*

Ryba, Fabrice, et al., Amplification and DRDoS Attack Defense—A Survey and New Perspectives, Saarland University, Saarbruecken, Germany, May 17, 2016 (Year: 2016).*

* cited by examiner

Scenario.Host.Method.Protocol.Attack Type.DoS Taxanomy 1-to-1.VIC.REF.DNS.DR.DOS
N-to-1.VIC.REF.DNS.DR.DOS
1-to-1.ZOM.REF.DNS.DR.DOS
1-to-N.ZOM.REF.DNS.DR.DOS
N-to-1.ZOM.REF.DNS.DR.DOS
1-to-1.VIC.AMP.DNS.DR.DOS
N-to-1.VIC.AMP.DNS.DR.DOS
1-to-1.ZOM.AMP.DNS.DR.DOS
1-to-N.ZOM.AMP.DNS.DR.DOS
N-to-1.ZOM.AMP.DNS.DR.DOS

FIG. 6

FIG. 7

APPARATUS AND METHOD FOR DETECTING DISTRIBUTED REFLECTION DENIAL OF SERVICE ATTACK

CROSS REFERENCE TO RELATED APPLICATION

This application claims the benefit of Korean Patent Application No. 10-2016-0149511, filed Nov. 10, 2016, which is hereby incorporated by reference in its entirety into this application.

BACKGROUND OF THE INVENTION

1. Technical Field

The present invention relates generally to technology for detecting a Distributed Reflection Denial of Service (DRDoS) attack and, more particularly, to technology for detecting a DRDoS attack on an Internet Service Provider (ISP) network to which load balancing is applied.

2. Description of the Related Art

A Denial of Service (DoS) attack is an attack that makes the resources of a system unavailable by maliciously attacking the corresponding system, thus making it impossible to use the resources for the originally intended purpose of the resources. An attack that makes a large number of attempts to access a specific server and prevents other users from using the service provided by the server or that interrupts the Transmission Control Protocol (TCP) connection of a server is a representative kind of such DoS attacks.

Further, a Distributed DoS (DDoS) attack, which is a kind of DoS attack, refers to an attack method that arranges a plurality of attackers in a distributed manner, and causes the attackers to simultaneously make DoS attacks. Such a DDoS attack is configured to infect a normal user's PC through a malicious program, such as malicious code or a virus, to turn the user's PC into a zombie PC, and to make attacks through a Command and Control (C&C) server.

Furthermore, a Distributed Reflection DoS (DRDoS) attack, which is an evolved form of a DDoS attack, utilizes a system that is providing service normally as an agent for a DDoS attack by exploiting vulnerabilities in a network communication protocol structure, without requiring the installation of a separate agent.

Such DRDoS attacks can be easily launched, and the recovery of sites attacked by DRDoS attacks is difficult compared to existing DDoS attacks. Further, the extent of damage caused by DRDoS attacks and the probability of success of DRDoS attacks are similar to those of DDoS attacks, and the results of damage caused by DRDoS attacks are similar to those of DDoS attacks. Accordingly, it is difficult to determine the attack method even after damage has occurred, and to detect DRDoS attacks using only existing DDoS detection methods.

Therefore, there is required the development of technology that detects DRDoS attacks in real time by modeling various types of DDoS-related traffic.

PRIOR ART DOCUMENTS

Patent Documents (Patent Document 1) Korean Patent No. 10-1420301 (Date of publication: Mar. 13, 2014, entitled "Method and Apparatus for Detecting DDoS Attack")

SUMMARY OF THE INVENTION

Accordingly, the present invention has been made keeping in mind the above problems occurring in the prior art, and an object of the present invention is to detect a Distributed Reflection DoS (DRDoS) attack in real time by modeling DDoS-related traffic using network flow data.

Another object of the present invention is to detect signs of attacks on various protocols used in DRDoS attacks.

A further object of the present invention is to provide an optimal scenario that detects a DRDoS attack.

In accordance with an aspect of the present invention to accomplish the above objects, there is provided an apparatus for detecting a DRDoS attack, including a network flow data reception unit for receiving network flow data from network equipment, a session type determination unit for determining a session type of the received network flow data, a host type determination unit for determining a type of host corresponding to the network flow data based on the session type, an attack method determination unit for determining an attack method corresponding to the network flow data, a protocol identification unit for identifying a protocol of the network flow data, and an attack detection unit for detecting a DRDoS attack based on the session type, the host type, the attack method, and the protocol.

The session type determination unit may be configured to classify the session type as any one of a one-to-one session type, a one-to-many session type, and a many-to-one session type based on a number of sessions corresponding to the network flow data.

The host type determination unit may be configured to determine directionality of the sessions, based on a source port number and a destination port number of the network flow data, and to determine the type of host to be any one of an attack target and an attacker using the directionality of the sessions.

The attack method determination unit may be configured to determine whether an attack corresponding to the network flow data is any one of a reflection attack and an amplification attack, based on at least one of a number and a size of packets in the network flow data.

The protocol of the network flow data may include at least one of a Domain Name System (DNS) protocol and a Network Time Protocol (NTP).

The network flow data reception unit may be configured to receive the network flow data corresponding to an Internet Service Provider (ISP) network to which load balancing is applied.

The apparatus may further include a modeling unit for generating a detection model based on results of detection of the DRDoS attack.

In accordance with another aspect of the present invention to accomplish the above objects, there is provided a method for detecting a DRDoS attack, the method being performed by a DRDoS attack detection apparatus, including receiving network flow data from network equipment, determining a session type of the received network flow data, determining a type of host corresponding to the network flow data based on the session type, determining an attack method corresponding to the network flow data, identifying a protocol of the network flow data, and detecting a DRDoS attack based on the session type, the host type, the attack method, and the protocol.

Determining the session type of the network flow data may be configured to classify the session type as any one of a one-to-one session type, a one-to-many session type, and a many-to-one session type based on a number of sessions corresponding to the network flow data.

Determining the type of host may be configured to determine directionality of the sessions, based on a source port number and a destination port number of the network flow data, and to determine the type of host to be any one of an attack target and an attacker using the directionality of the sessions Determining the attack method may be configured to determine whether an attack corresponding to the network flow data is any one of a reflection attack and an amplification attack, based on at least one of a number and a size of packets in the network flow data The protocol of the network flow data may include at least one of a Domain Name System (DNS) protocol and a Network Time Protocol (NTP).

Receiving the network flow data may be configured to receive the network flow data corresponding to an Internet Service Provider (ISP) network to which load balancing is applied.

The method may further include generating a detection model based on results of detection of the DRDoS attack.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 1:
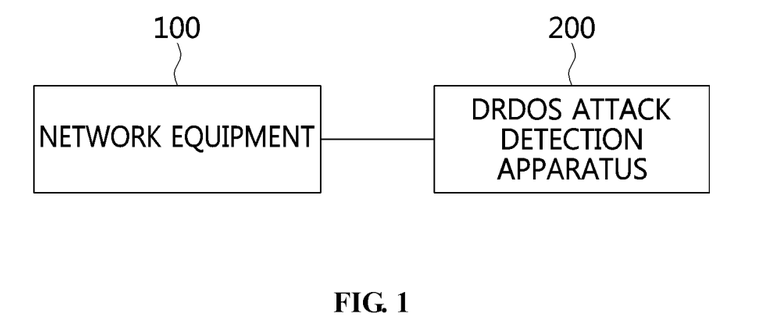
FIG. 1 is a diagram schematically illustrating an environment to which an apparatus for detecting a DRDoS attack according to an embodiment of the present invention is applied.

FIG. 1 is a diagram schematically illustrating an environment to which an apparatus for detecting a DRDoS attack according to an embodiment of the present invention is applied.

As illustrated in FIG. 1, a system for detecting a DRDoS attack includes network equipment 100 and an apparatus 200 for detecting a DRDoS attack (hereinafter also referred to as a "DRDoS attack detection apparatus 200").

First, the network equipment 100 transmits data that is transferred over a network to the DRDoS attack detection apparatus 200.

Here, the network equipment 100 is configured such that multiple devices are connected to configure a network, and may refer to a switch, a router, a hub, etc., but the type of network equipment 100 is not limited thereto.

Further, the network equipment 100 may collect network flow data (nFlow data), such as a network flow (NetFlow), Internet Protocol Flow Information Export (IPFIX), sFlow, Jflow, and Cflowd, and may transmit the collected network flow data to the DRDoS attack detection apparatus 200. Here, the network equipment 100 may collect network flow data on an ISP network to which load balancing is applied so as to distribute traffic overload.

Next, the DRDoS attack detection apparatus 200 determines the session type, host type, attack method, and protocol of the network flow data by analyzing the network flow data collected from the network equipment 100. Further, the DRDoS attack detection apparatus 200 detects a DRDoS attack based on the determined session type, host type, attack method, and protocol.

Here, the network flow data collected from the network equipment 100 may be network flow data corresponding to the ISP network to which load balancing is applied.

Further, the DRDoS attack detection apparatus 200 may classify the session type as any one of a one-to-one session type, a one-to-many session type, and a many-to-one session type based on the number of sessions corresponding to the network flow data.

Furthermore, the DRDoS attack detection apparatus 200 may determine the directionality of the sessions based on source port information and destination port information, and may classify each of the one-to-one session type, the one-to-many session type, and the many-to-one session type as any one of a session from a server to a client (S2C session) and a session from a client to a server (C2S session) based on the directionality of the sessions. That is, the DRDoS attack detection apparatus 200 may classify session types corresponding to the network flow data into a total of five types.

Here, the DRDoS attack detection apparatus 200 may determine whether the type of host is an attack target (victim) or an attacker (zombie) based on the directionality of the sessions.

Also, the DRDoS attack detection apparatus 200 may determine whether the attack corresponding to the network flow data is a reflection attack or an amplification attack, based on at least one of the number and size of packets in the network flow data.

Further, the DRDoS attack detection apparatus 200 may identify the protocol of the network flow data, and the protocol of the network flow data may be a Domain Name System (DNS) protocol, a network time protocol (NTP), or the like.

Also, the DRDoS attack detection apparatus 200 may generate a detection model based on the results of detection of the DRDoS attack. Here, the DRDoS attack detection apparatus 200 may generate the detection model by classifying the network flow data according to the attack type, the protocol, the attack method, the host, and the scenario.

In order to detect a DoS attack, conventional DDoS detection apparatuses check the amount of load that is processed when the network is in a normal state, define specific parameters related to the analysis of signs of network abnormalities, and define thresholds for parameter values in the normal state.

Here, various parameters, such as Central Processing Unit (CPU) usage and load, information about a packet size and a packet header, the distribution of protocols, the maximum value and the mean value of an overall traffic amount, concentration on a specific host, monitoring of flows that use a spoofed address, network flow information, etc. may be utilized as the parameters.

The conventional DDoS detection devices detect DDoS attacks based on statistical values obtained depending on such preliminary knowledge, and mainly detect DoS attacks using a specific pattern or a signature based on information contained in IP packet headers.

However, a DRDoS attack is an attack method that is further evolved from a DDoS attack to a higher level, and is characterized in that a system that is providing service normally is utilized as an agent for a DDoS attack by exploiting vulnerabilities in a network communication protocol structure, without installing an additional agent.

A DRDoS attack is an attack method for sending an Internet Control Message Protocol (ICMP) echo request packet, in which an IP address is spoofed, to a broadcast address and transmitting a large number of echo reply packets to an attack target, thus bringing the attack target down, or an attack method for causing a SYN/ACK flood on the attack target by exploiting vulnerabilities in a TCP/IP network, thus bringing the attack target down. That is, it is difficult to detect a DRDoS attack using only the conventional DDoS attack detection method.

Therefore, the DRDoS attack detection apparatus 200 according to the embodiment of the present invention detects a DRDoS attack in real time by modeling various types of DDoS-related traffic on the ISP network to which load balancing is applied.

Hereinafter, the configuration of the DRDoS attack detection apparatus 200 according to an embodiment of the present invention will be described in detail with reference to FIG. 2.

Figure 2:
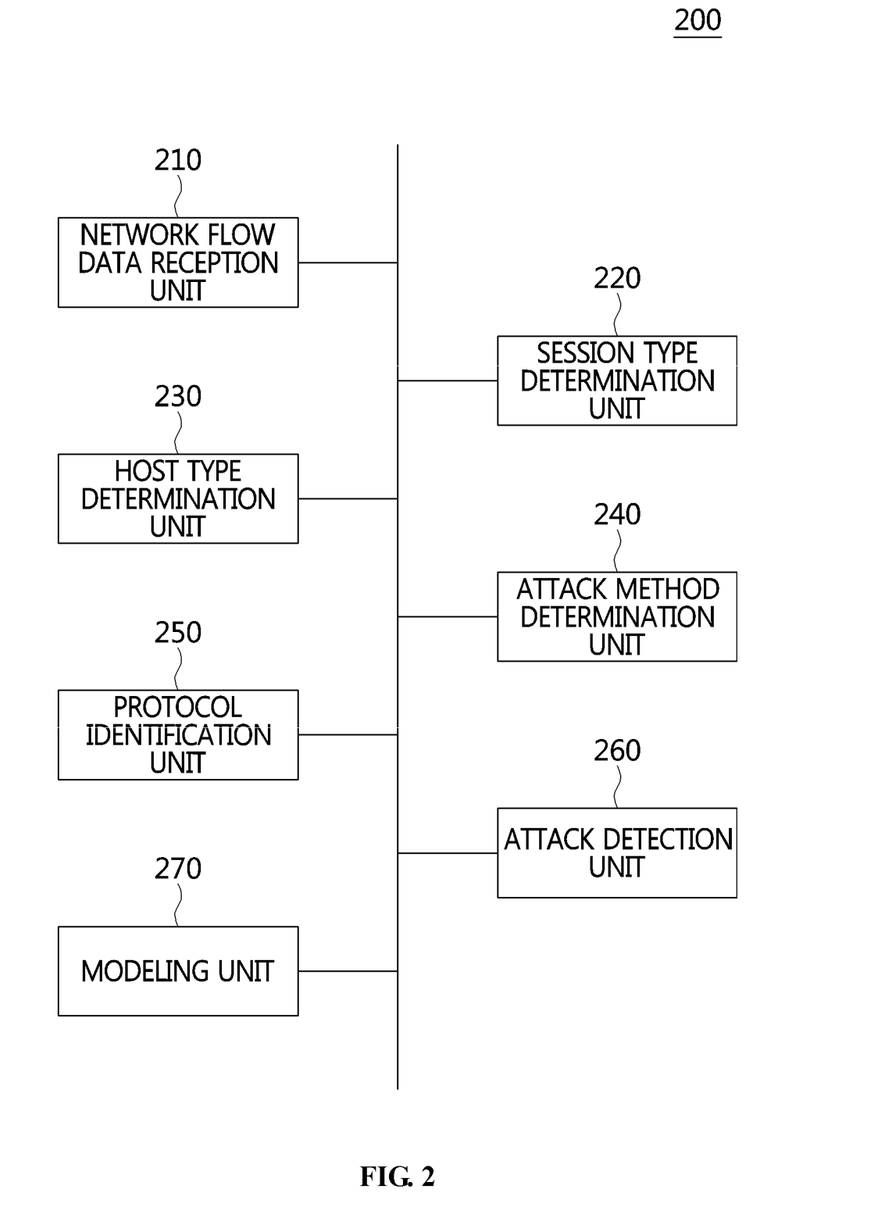
FIG. 2 is a block diagram illustrating the configuration of an apparatus for detecting a DRDoS attack according to an embodiment of the present invention.

FIG. 2 is a block diagram illustrating the configuration of a DRDoS attack detection apparatus according to an embodiment of the present invention.

As illustrated in FIG. 2, the DRDoS attack detection apparatus 200 includes a network flow data reception unit 210, a session type determination unit 220, a host type determination unit 230, an attack method determination unit 240, a protocol identification unit 250, an attack detection unit 260, and a modeling unit 270.

First, the network flow data reception unit 210 receives network flow data from network equipment. Here, the network flow data reception unit 210 may receive the network flow data corresponding to an ISP network to which load balancing is applied from the network equipment.

Further, the session type determination unit 220 determines the session type of the received network flow data. In the case of a DRDoS attack that uses a Network Time Protocol (NTP) or a Domain Name System (DNS) protocol on the ISP network to which load balancing is applied, the direction of communication is determined depending on the link of the collected network flow data.

That is, the session type determination unit 220 may classify session types into five types depending on asynchronous routing. First, the types of session in which a server transmits data to a client are classified into two types. A first session type is a one-to-one S2C type, which indicates the case where one session from a server to a client is formed. Further, a second session type is a many-to-one S2C type, which indicates the case where multiple sessions from multiple servers to one client are formed.

Meanwhile, the types of session from a client to a server are classified into three types. A third session type is a one-to-one C2S type, which indicates the case where a session from one client to one server is formed. A fourth session type is a many-to-one C2S type, which indicates the case where sessions from multiple clients to one server are formed. A fifth session type is a one-to-many C2S type, which indicates the case where sessions from one client to multiple servers are formed.

Although the session type determination unit 220 has been described as classifying sessions into a total of five types based on the number of sessions and the directionality of the sessions for convenience of description, the present invention is not limited thereto. That is, the session type determination unit 220 may determine that each session type is any one of a one-to-one session type, a one-to-many session type, and a many-to-one session type based on the number of sessions. Further, the host type determination unit 230, which will be described later, may determine the type of host based on the directionality of the sessions and may classify session types into a total of five session types.

Next, the host type determination unit 230 determines the type of host corresponding to network flow data based on the session types.

Here, the host type determination unit 230 may determine the directionality of the sessions based on the source port number and the destination port number of the network flow data, and may determine the type of host to be any one of an attack target (victim) and an attacker (zombie) using the directionality of the sessions.

The host type determination unit 230 may determine the type of host corresponding to network flow data based on the source port number and the destination port number contained in the flow record of NetFlow. The host type determination unit 230 may determine, using port number 53 and port number 123, which are well-known ports used for DNS and NTP, whether the network flow data is data that is transmitted from a client to a server or data that is transmitted from a server to a client.

For example, when the source port is an arbitrary port having a port number of 1024 or more and the port number of the destination port is 53 or 123, the corresponding network flow data may be a DNS or NTP request message. Further, when the source port number is 53 or 123 and the destination port is an arbitrary port having a port number of 1024 or more, the corresponding network flow data may be a DNS or NTP reply message.

In this way, the host type determination unit 230 may determine the directionality of sessions based on a source port and a destination port, and may then check whether the type of host is an attack target (i.e. victim) or an attacker (i.e. zombie). Further, when the session type determination unit 220 classifies session types into five types, the host type determination unit 230 may also determine the type of host based on the classified session types.

Furthermore, the attack method determination unit 240 determines an attack method corresponding to the network flow data.

The attack method determination unit 240 may determine whether the attack method corresponding to the network flow data is a reflection attack or an amplification attack, based on at least one of the number and size of packets in the network flow data.

A reflection attack is an attack method for generating a large amount of traffic that cannot be covered by the network, thus preventing normal traffic from being processed. An attacker designates the IP address of an attack target (victim) as the original source IP address in a query and causes all replies to be sent to the IP address of the attack target, thus incapacitating the server of the attack target.

An amplification attack is an attack method for sending, on a large scale, a large number of DNS queries produced to create a large number of replies, thus consuming the outbound bandwidth of a DNS server. In particular, a DNS amplification attack, which is an amplification attack that uses the DNS server, is an attack method for changing a source IP address and causing replies to a request to be sent to the address of an attack target (victim) that is a forged IP address. The DNS amplification attack method may amplify the size of replies that are sent to more than several tens of times that of normal replies, thus paralyzing the attack target.

Further, an NTP amplification attack is an attack method for transmitting amplified User Datagram Protocol (UDP) packets through an open NTP server, thus preventing an attack target system from providing service normally. Such an NTP amplification attack is an attack method for changing a source IP address and causing replies to a request to be sent to the address of an attack target (victim) that is a forged IP address. That is, the NTP amplification attack is configured to cause a large number of replies to be sent to the IP address of the attack target using the 'monlist' function of an NTP server.

Next, the protocol identification unit 250 identifies the protocol of the network flow data. The protocol identification unit 250 checks the protocol information of the corresponding attack session based on the network flow data. Here, the protocol used in the attack may be a DNS protocol or an NTP, but the type of protocol is not limited thereto.

Further, the attack detection unit 260 detects a DRDoS attack based on the session type, the host type, the attack method, and the protocol.

Finally, the modeling unit 270 generates a detection model based on the results of detection of the DRDoS attack.

The modeling unit 270 may generate the detection model classified according to the attack type, the protocol, the attack method, the host type, and the session type.

Hereinafter, a DRDoS attack detection method performed by the DRDoS attack detection apparatus according to an embodiment of the present invention will be described in detail with reference to FIG. 3.

Figure 3:
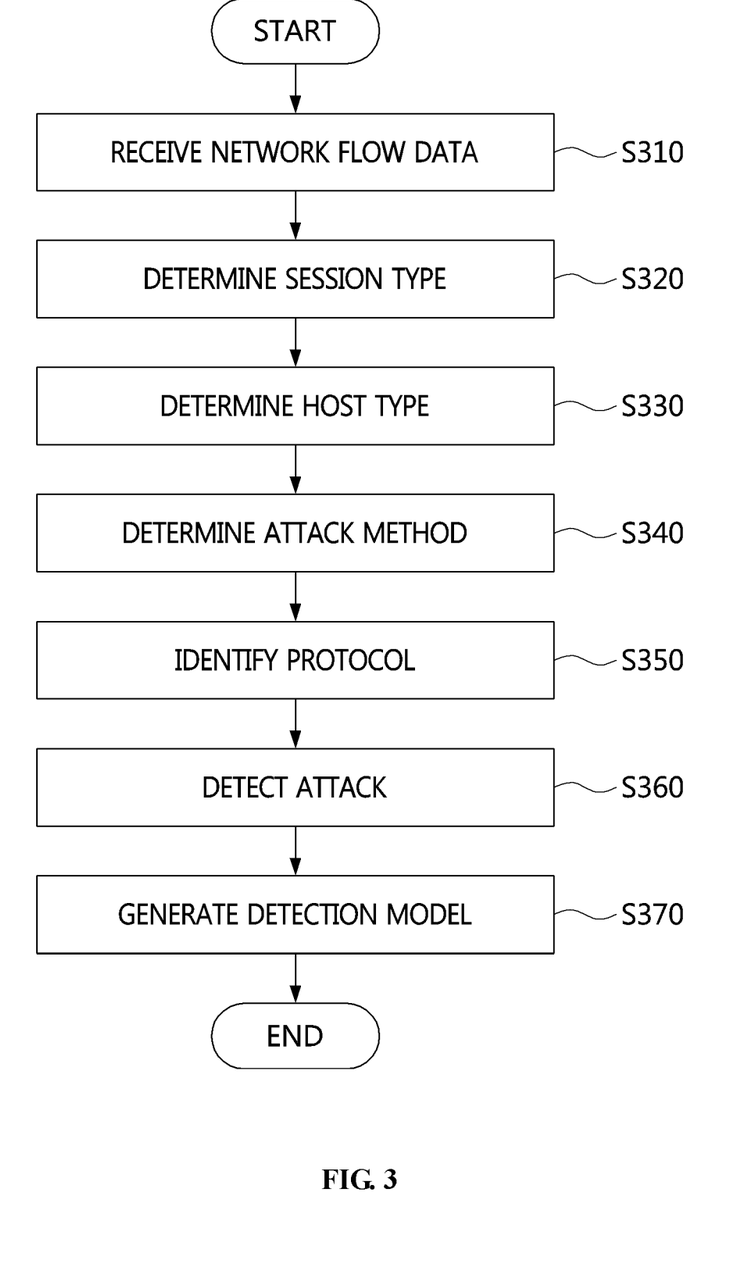
FIG. 3 is a flowchart for explaining a method for detecting a DRDoS attack according to an embodiment of the present invention.

FIG. 3 is a flowchart for explaining a DRDoS attack detection method according to an embodiment of the present invention.

First, the DRDoS attack detection apparatus 200 receives network flow data at step S310.

The DRDoS attack detection apparatus 200 may receive the network flow data on an ISP network to which load balancing is applied from the network equipment 100.

Next, the DRDoS attack detection apparatus 200 determines a session type at step S320, and determines a host type at step S330.

In detail, the DRDoS attack detection apparatus 200 determines the session type and the host type of the received network flow data. Session types may be classified into a total of three session types corresponding to a one-to-one session type, a one-to-many session type, and a many-to-one session type. Further, host types may be classified into a total of two session types corresponding to an S2C session type, which is a session from a server to a client, and a C2S session type, which is a session from a client to a server. That is, session types may be classified into a total of five types, corresponding to two session types in which a server transmits data to a client and three session types in which a client transmits data to a server.

A first session type is a one-to-one S2C type, which indicates the case where one session from a server to a client is formed. A second session type is a many-to-one S2C type, which indicates the case where multiple sessions from multiple servers to one client are formed.

Also, a third session type is a one-to-one C2S type, which indicates the case where a session from one client to one server is formed. A fourth session type is a many-to-one C2S type, which indicates the case where sessions from multiple clients to one server are formed. A fifth session type is a one-to-many C2S type, which indicates the case where multiple sessions from one client to multiple servers are formed.

Also, the DRDoS attack detection apparatus 200 determines the type of host corresponding to the network flow data based on the classified session type.

The DRDoS attack detection apparatus 200 may determine the directionality of sessions based on the source port number and the destination port number of the network flow data, and may determine the type of host to be any one of an attack target (victim) and an attacker (zombie) using the directionality of sessions.

For convenience of the description, the DRDoS attack detection apparatus 200 has been described as determining the session type based on the number of sessions and determining the host type based on the directionality of the sessions. However, the DRDoS attack detection apparatus 200 may determine the session type through only a single procedure using both the number of sessions and the directionality of the sessions.

When the type of host is an attack target, the session type may be any one of the first session type and the second session type, whereas when the type of host is an attacker, the session type may be any one of the third session type, the fourth session type, and the fifth session type.

Next, the DRDoS attack detection apparatus 200 determines the type of attack at step S340.

The DRDoS attack detection apparatus 200 may determine whether the attack corresponding to the network flow data is a reflection attack or an amplification attack, based on at least one of the number and size of packets in the network flow data.

Then, the DRDoS attack detection apparatus 200 identifies a protocol at step S350.

The DRDoS attack detection apparatus 200 may identify the protocol used in an attack by analyzing information about the protocol of the network flow data. Here, the protocol of the corresponding attack session may be any one of a DNS protocol, an NTP, and an additional protocol.

Then, the DRDoS attack detection apparatus 200 detects a DRDoS attack based on the results of analysis of the network flow data at step S360. The DRDoS attack detection apparatus 200 detects a DRDoS attack based on the information analyzed at steps S320 to S350.

Finally, the DRDoS attack detection apparatus 200 generates a detection model using the results of detection of the DRDoS attack at step S370.

The DRDoS attack detection apparatus 200 may generate the detection model classified according to the attack type, the protocol, the attack method, the host type, and the session type. Here, the attack type indicates whether the corresponding attack is a DDoS attack or a DRDoS attack, and the protocol may be any one of a DNS protocol, an NTP, and an additional protocol.

Also, the attack method may indicate whether the attack is a reflection attack or an amplification attack, and the host type and the session type may indicate any one of a one-to-one S2C session type, a many-to-one S2C session type, a one-to-one C2S session type, a many-to-one C2S session type, and a one-to-many C2S session type.

Further, the DRDoS attack detection apparatus 200 may detect a DRDoS attack in real time using the generated detection model.

Figure 4:
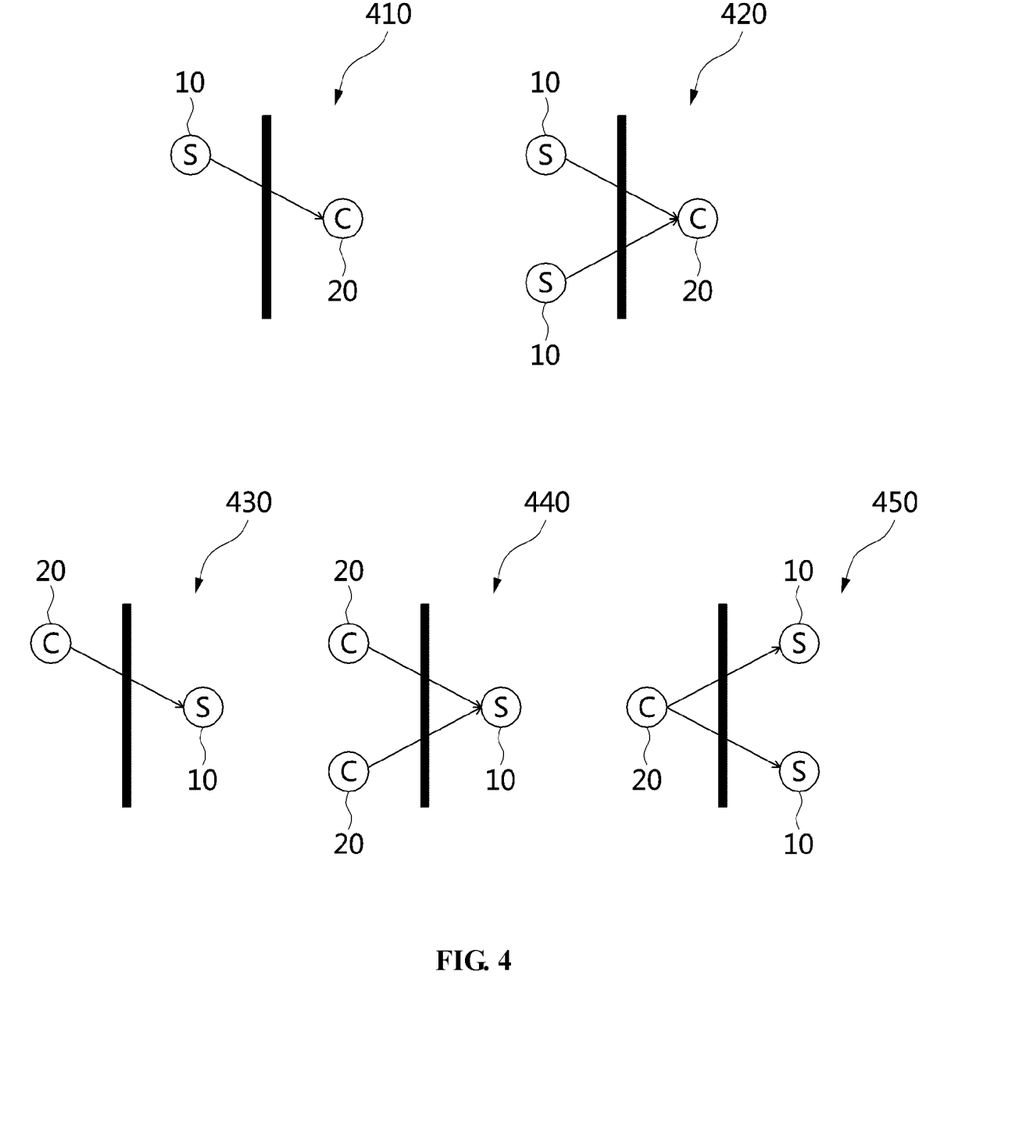
FIG. 4 is a diagram illustrating session types according to an embodiment of the present invention.

FIG. 4 is a diagram illustrating session types according to an embodiment of the present invention.

As illustrated in FIG. 4, the DRDoS attack detection apparatus 200 may classify session types into a total of five types.

First, sessions in which a server 10 transmits data to a client 20 are classified into two types. A first session type 410 is a one-to-one S2C type, which indicates the case where one session from the server 10 to the client 20 is formed. Further, a second session type 420 is a many-to-one S2C type, which indicates the case where multiple sessions from multiple servers 10 to one client 20 are formed.

In contrast, sessions from a client 20 to a server 10 are classified into three types. A third session type 430 is a one-one-one C2S type, which indicates the case where a session from one client 20 to one server 10 is formed. A fourth session type 440 is a many-to-one C2S type, which indicates the case where sessions from multiple clients 20 to one server 10 are formed. Further, a fifth session type 450 is a one-to-many C2S type, which indicates the case where sessions from one client 20 to multiple servers 10 are formed.

Figure 5:
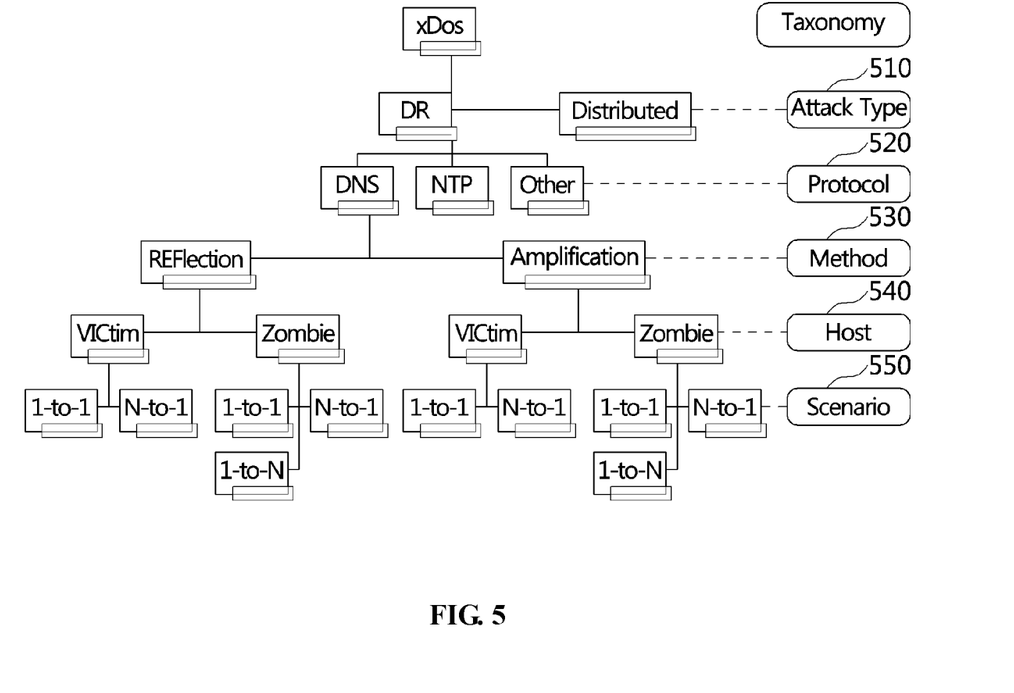
FIG. 5 is a diagram illustrating a detection model according to an embodiment of the present invention.

FIG. 5 is a diagram illustrating a detection model according to an embodiment of the present invention.

As illustrated in FIG. 5, a detection model for a DRDoS attack classifies DoS attacks according to an attack type 510. The DoS attacks are divided into DRDoS attacks and DDoS attacks.

Also, DRDoS attacks may be classified according to the type of protocol 520. The DRDoS attacks may use a protocol such as a DNS protocol or an NTP, and may be classified according to the type of protocol used in an attack.

Further, DRDoS attacks may be classified into a reflection attack and an amplification attack according to an attack method 530.

In the DRDoS attacks, the types of host 540 may be classified into an attack target (victim) and an attacker (zombie) based on the directionality of sessions, and attack target (victim) hosts may be classified into a one-to-one (1-to-1) session type and a many-to-one (N-to-1) session type according to the number of sessions. Further, attacker (zombie) hosts may be classified into a one-to-one (1-to-1) session type, a one-to-many (1-to-N) session type, and a many-to-one (N-to-1) session type according to the number of sessions.

Although only the case where the protocol is a DNS protocol has been illustrated for convenience of description, the type of protocol is not limited thereto, and the present invention may generate detection models for various protocols used in DRDoS attacks, such as an NTP and a Simple Network Management Protocol (SNMP), and may detect DRDoS attacks for various protocols.

Figure 6:
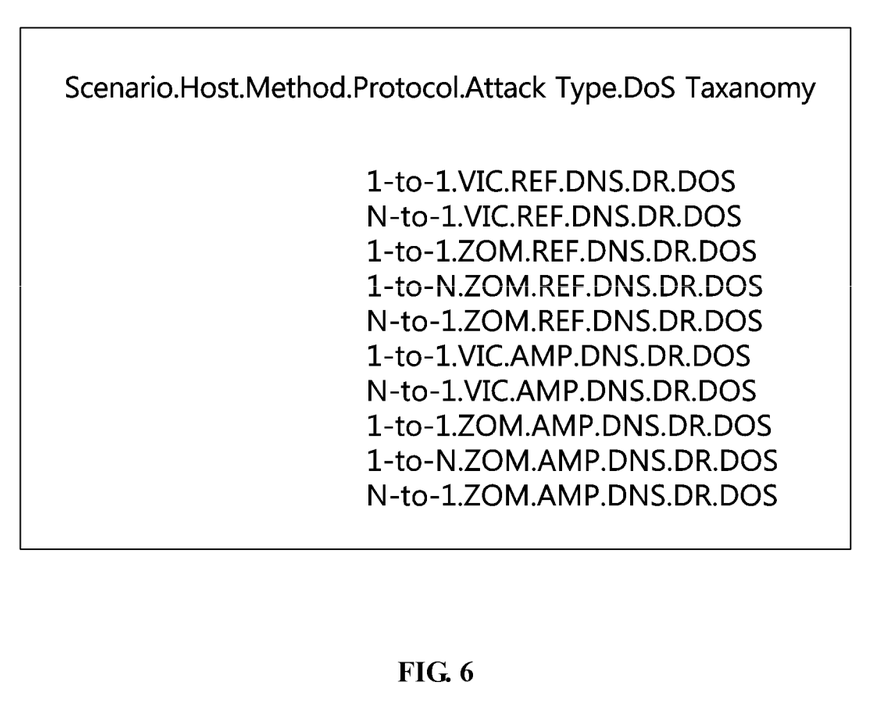
FIG. 6 is a diagram illustrating the results of detection of a DRDoS attack according to an embodiment of the present invention.

FIG. 6 is a diagram illustrating the results of detection of a DRDoS attack according to an embodiment of the present invention.

As illustrated in FIG. 6, the results of detection of a DRDoS attack may be classified into a total of 10 scenarios. For example, "1-to-1.VIC.REF.DNS.DR.DOS" means a scenario for a DRDoS attack in which a session type is a one-to-one session type, the type of host is an attack target (victim), an attack method is a reflection attack (REF), and a Domain Name System (DNS) protocol is used.

Further, "N-to-1.ZOM.AMP.DNS.DR.DOS" means a scenario for a DRDoS attack in which a session type is a many-to-one session type, the type of host is an attacker (zombie), an attack method is an amplification attack (AMP), and a DNS protocol is used.

Figure 7:
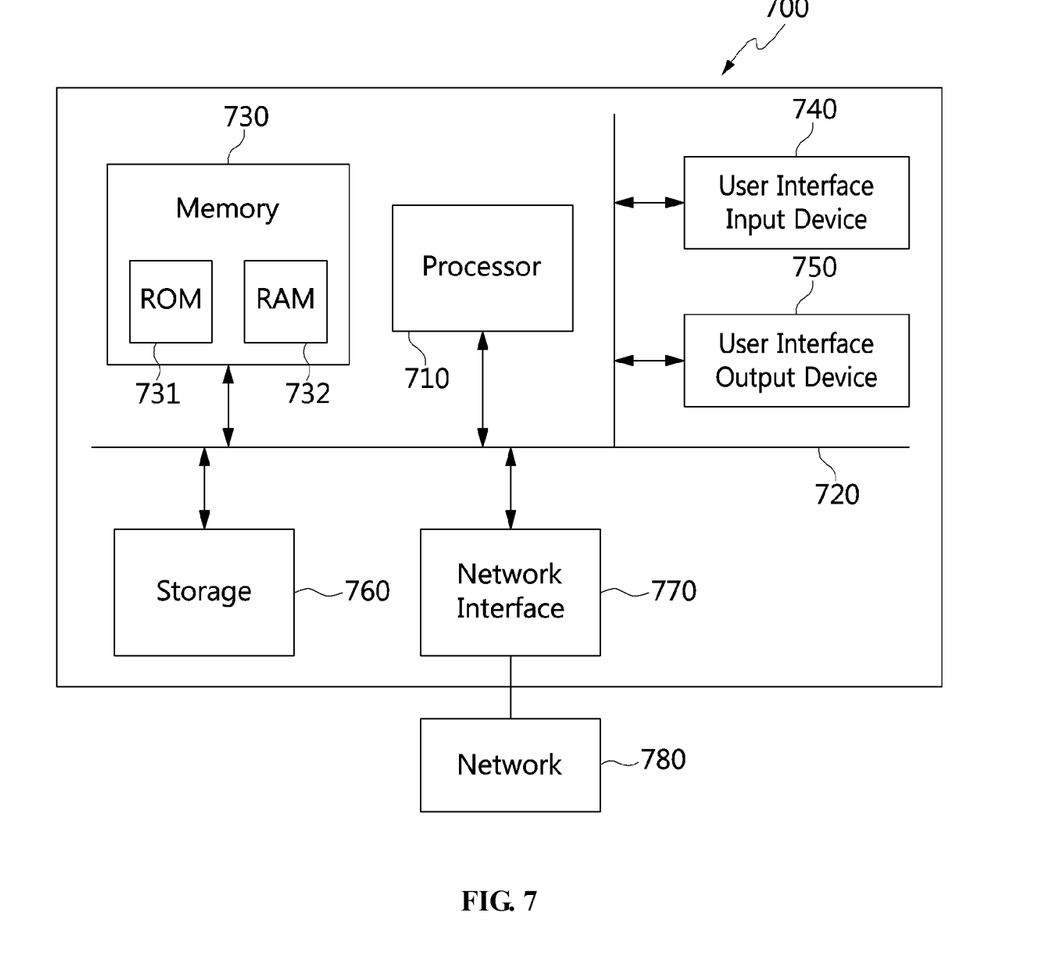
FIG. 7 is a block diagram illustrating a computer system according to an embodiment of the present invention.

FIG. 7 is a block diagram illustrating a computer system according to an embodiment of the present invention.

Referring to FIG. 7, the embodiment of the present invention may be implemented in a computer system 700 such as a computer-readable storage medium. As shown in FIG. 7, the computer system 700 may include one or more processors 710, memory 730, a user interface input device 740, a user interface output device 750, and storage 760, which communicate with each other through a bus 720. The computer system 700 may further include a network interface 770 connected to a network 780. Each processor 710 may be a Central Processing Unit (CPU) or a semiconductor device for executing processing instructions stored in the memory 730 or the storage 760. Each of the memory 730 and the storage 760 may be any of various types of volatile or nonvolatile storage media. For example, the memory 730 may include Read-Only Memory (ROM) 731 or Random Access Memory (RAM) 732.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, a Distributed Reflection DoS (DRDoS) attack may be detected by modeling DDoS-related traffic using network flow data.

Further, in accordance with the present invention, signs of attacks on various protocols used in DRDoS attacks may be detected.

Furthermore, in accordance with the present invention, an optimal scenario that detects a DRDoS attack may be provided.

As described above, in the apparatus and method for detecting a DRDoS attack according to the present invention, the configurations and schemes in the above-described embodiments are not limitedly applied, and some or all of the above embodiments can be selectively combined and configured so that various modifications are possible.

What is claimed is:

1. An apparatus for detecting a Distributed Reflection Denial of Service (DRDoS) attack, comprising a processor and a memory storing instructions executable by the processor as units including:
   a network flow data reception unit for receiving network flow data from network equipment;
   a session type determination unit for determining a session type of sessions corresponding to the received network flow data;
   a host type determination unit for determining a type of host corresponding to the network flow data based on the session type;
   an attack method determination unit for determining an attack method corresponding to the network flow data;
   a protocol identification unit for identifying a protocol of the network flow data; and an attack detection unit for detecting a DRDoS attack based on the session type, the host type, the attack method, and the protocol; and
   a modeling unit for generating a detection model based on results of detection of the DRDoS attack;
   wherein the host type determination unit is configured to determine directionality of the sessions, based on a source port number and a destination port number of the network flow data, and to determine the type of host to be any one of an attack target and an attacker using the directionality of the sessions; and
   wherein the modeling unit is configured to generate a detection model that
      classifies DoS attacks according to one of attack types, the attack types including DRDoS attacks and Distributed Denial of Service (DDoS) attacks,
      the DRDoS attacks being classified according to
         types of protocols, the types of protocols including a Domain Name System (DNS) protocol and a Network Time Protocol (NTP), and
         attack methods, the attack methods including a reflection attack and an amplification attack,
      classifies types of hosts, the types of hosts including an attack target and an attacker, based on the directionality of the sessions,
      classifies attack target hosts based on session types, the session types including a one-to-one (1-to-1) session type and a many-to-one (N-to-1) session type according to a number of sessions corresponding the network flow data, and
      classifies attacker hosts based on the session types.

2. The apparatus of claim 1, wherein the session type determination unit is configured to classify the session type as any one of a one-to-one session type, a one-to-many session type, and a many-to-one session type based on the number of the sessions corresponding to the network flow data.

3. The apparatus of claim 1, wherein the attack method determination unit is configured to determine whether an attack corresponding to the network flow data is any one of a reflection attack and an amplification attack, based on at least one of a number and a size of packets in the network flow data.

4. The apparatus of claim 3, wherein the protocol of the network flow data includes at least one of the DNS protocol and the NTP.

5. The apparatus of claim 1, wherein the network flow data reception unit is configured to receive the network flow data via an Internet Service Provider (ISP) network to which load balancing is applied.

6. A method for detecting a Distributed Reflection Denial of Service (DRDoS) attack, the method being performed by a DRDoS attack detection apparatus, comprising:
   receiving network flow data from network equipment;
   determining a session type of sessions corresponding to the received network flow data;
   determining a type of host corresponding to the network flow data based on the session type;
   determining an attack method corresponding to the network flow data;
   identifying a protocol of the network flow data;
   detecting a DRDoS attack based on the session type, the host type, the attack method, and the protocol; and
   generating a detection model based on results of detection of the DRDoS attack;
   wherein determining the type of host comprises determining directionality of the sessions, based on a source port number and a destination port number of the network flow data, and to determine the type of host to be any one of an attack target and an attacker using the directionality of the sessions; and
   wherein the detection model
      classifies DoS attacks according to one of attack types, the attack types including DRDoS attacks and Distributed Denial of Service (DDoS) attacks,
      the DRDoS attacks being classified according to
         types of protocols, the types of protocols including a Domain Name System (DNS) protocol and a Network Time Protocol (NTP), and
         attack methods, the attack methods including a reflection attack and an amplification attack,
      classifies types of hosts, the types of hosts including an attack target and an attacker based on the directionality of the sessions,
      classifies attack target hosts based on session types, the session types including a one-to-one (1-to-1) session type and a many-to-one (N-to-1) session type according to a number of sessions corresponding the network flow data, and
      classifies attacker hosts based on the session types.

7. The method of claim 6, wherein determining the session type of the network flow data comprises classifying the session type as any one of a one-to-one session type, a one-to-many session type, and a many-to-one session type based on the number of the sessions corresponding to the network flow data.

8. The method of claim 6, wherein determining the attack method comprises determining whether an attack corresponding to the network flow data is any one of a reflection attack and an amplification attack, based on at least one of a number and a size of packets in the network flow data.

9. The method of claim 8, wherein the protocol of the network flow data includes at least one of the DNS protocol and the NTP.

10. The method of claim 6, wherein receiving the network flow data comprises receiving the network flow data via an Internet Service Provider (ISP) network to which load balancing is applied.

\* \* \* \* \*